United States Patent
Löwstedt et al.

(10) Patent No.: US 11,408,379 B2
(45) Date of Patent: Aug. 9, 2022

(54) AIR SUPPLY ARRANGEMENT FOR SUPPLYING AIR TO AN INTERNAL COMBUSTION ENGINE

(71) Applicant: Volvo Truck Corporation, Gothenburg (SE)

(72) Inventors: Carl Löwstedt, Onsala (SE); Hans Rönnings, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/250,149

(22) PCT Filed: Jun. 11, 2018

(86) PCT No.: PCT/EP2018/065384
§ 371 (c)(1),
(2) Date: Dec. 7, 2020

(87) PCT Pub. No.: WO2019/238211
PCT Pub. Date: Dec. 19, 2019

(65) Prior Publication Data
US 2021/0246853 A1    Aug. 12, 2021

(51) Int. Cl.
*F02M 35/08* (2006.01)
*B01D 46/00* (2022.01)
*B01D 46/46* (2006.01)
*B01D 46/48* (2006.01)
*F02M 35/024* (2006.01)
(Continued)

(52) U.S. Cl.
CPC ....... *F02M 35/086* (2013.01); *B01D 46/0043* (2013.01); *B01D 46/46* (2013.01);
(Continued)

(58) Field of Classification Search
CPC .............. F02M 35/086; F02M 35/024; F02M 35/10091; F02M 35/10262; F02M 35/164;
(Continued)

(56) References Cited

U.S. PATENT DOCUMENTS

| 2011/0083419 A1 | 4/2011 | Upadhyay et al. |
| 2012/0124961 A1 | 5/2012 | Jarrier et al. |

(Continued)

FOREIGN PATENT DOCUMENTS

| CN | 102042087 A | 5/2011 |
| CN | 105604751 A | 5/2016 |

(Continued)

OTHER PUBLICATIONS

International Search Report and Written Opinion for PCT/EP2018/065384, dated Aug. 3, 2018, 12 pages.

(Continued)

*Primary Examiner* — Jacob M Amick
*Assistant Examiner* — Charles J Brauch
(74) *Attorney, Agent, or Firm* — Withrow & Terranova, PLLC

(57) ABSTRACT

The invention relates to a an air supply arrangement (100) for supplying air from the atmosphere towards an internal combustion engine in a vehicle, the air supply arrangement comprising an air intake (101) for intake of air from the atmosphere, an air outlet (102) for outlet of air towards the internal combustion engine, and an air duct (103) for leading air from the air intake (101) in a downstream direction to the air outlet (102). A separator (200) is arranged in the air duct (103) so as to divide the air duct (103) into an upstream portion (104) and a downstream portion (105) for filtering of atmospheric air from debris by passage of said atmospheric air through the separator (200). The air supply arrangement (100) further comprises a compressed air delivery arrangement (300) being arranged to supply compressed air towards the separator (200) for cleaning the separator (200) from assembled debris.

19 Claims, 6 Drawing Sheets

(51) Int. Cl.
*F02M 35/10* (2006.01)
*B01D 46/71* (2022.01)

(52) U.S. Cl.
CPC ............ *B01D 46/48* (2013.01); *B01D 46/71* (2022.01); *F02M 35/024* (2013.01); *F02M 35/10091* (2013.01); *F02M 35/10262* (2013.01); *B01D 2279/60* (2013.01)

(58) Field of Classification Search
CPC ............ F02M 35/0226; B01D 46/0043; B01D 46/46; B01D 46/48; B01D 46/71; B01D 2279/60; B01D 50/20; B01D 45/06; Y02T 10/12
See application file for complete search history.

(56) References Cited

U.S. PATENT DOCUMENTS

| | | |
|---|---|---|
| 2013/0025557 A1 | 1/2013 | Chlystek et al. |
| 2014/0150384 A1 | 6/2014 | Bunnell et al. |
| 2014/0165514 A1* | 6/2014 | Licht .................. B01D 45/06 55/423 |
| 2015/0176545 A1* | 6/2015 | Troxell ............ B01D 46/0005 55/302 |
| 2016/0367923 A1 | 12/2016 | Novosel et al. |

FOREIGN PATENT DOCUMENTS

| | | | |
|---|---|---|---|
| EP | 2829716 A1 * | 1/2015 | ....... F02M 35/10262 |
| EP | 2829716 A1 | 1/2015 | |
| FR | 3028564 A1 | 5/2016 | |
| JP | 2003276996 A | 10/2003 | |
| JP | 2012144190 A | 8/2012 | |

OTHER PUBLICATIONS

First Office Action for Chinese Patent Application No. 201880094378.9, dated Nov. 2, 2021, 19 pages.

* cited by examiner

AIR SUPPLY ARRANGEMENT FOR SUPPLYING AIR TO AN INTERNAL COMBUSTION ENGINE

This application is a 35 USC 371 national phase filing of International Application No. PCT/EP2018/065384, filed Jun. 11, 2018, the disclosure of which is incorporated herein by reference in its entirety.

TECHNICAL FIELD

The invention relates to an air supply arrangement for supplying air from the atmosphere towards an internal combustion engine in a vehicle. It also relates to a vehicle comprising an air supply arrangement, and to a method for controlling an air supply arrangement.

The invention can be applied in heavy-duty vehicles, such as trucks, buses and construction equipment. Although the invention will be described with respect to an truck, the invention is not restricted to this particular vehicle, but may also be used in other vehicles such as buses or construction equipment.

BACKGROUND

An internal combustion engine receives air to combust fuel in a combustion chamber to produce power. Such an engine is provided with an intake system in order to supply air from the outside of the vehicle to the internal combustion engine.

The air intake system of a vehicle may include an air intake followed by an intake duct, for supplying air to an air cleaner arrangement. The air cleaner arrangement typically comprises an air cleaner housing in which an air filter is arranged, to filter the air from dust by passage through the air filter before reaching the internal combustion engine. Air cleaner arrangements and air filters may be designed in many different shapes and configurations. The most common solution in today's trucks is to use a cylindrical air cleaner with a cylindrical air filter.

The air filter needs to be replaced on a regular basis (from e.g. every month to every second year) to keep the air cleaning function on a desired level.

Some trucks are used in very dusty environments, such as deserts and other areas where the air is frequently thick with dry particles. In such environments the air cleaner becomes filled with dust faster than usual and the air filter must be replaced more frequently than in other environments. The filter replacement procedures are time consuming since they often require that the cab of the vehicle is tilted to perform the replacement. Moreover, the need for filter replacement may result in unplanned stops while driving.

To reduce the problems with the air cleaner becoming filled with dust so quickly, it has been proposed to provide a pre-cleaner arranged in the air intake system, upstream the air filter in the air cleaner arrangement. The task of the pre-cleaner is to remove some of the dust from the air before the air reaches the air cleaner arrangement. To this end, the pre-cleaner may comprise a separator, for example a net or grid, which is adapted to hinder relatively large dust particles from continuing downstream the air intake system. Any remaining, smaller particles may be removed by the downstream air filter.

However, many existing pre-cleaners are unsatisfactory since they result in an undesired pressure drop. If the pre-cleaners are upsized to remedy the pressure drop, they become too heavy for the cab wall of the vehicle.

Also, the pre-cleaners may in time become filled with dust, and require cleaning and/or replacement, which in turn may be time-consuming.

As such, it would be desirable to provide an improved air supply arrangement, in particular an air supply arrangement which is suitable for use in dusty environments.

SUMMARY

An object of the invention is to provide an air supply arrangement which may reduce the working time for replacement or cleaning of air filters and/or for replacement or cleaning of pre-cleaners.

The object is achieved by an air supply arrangement according to claim 1.

As such, the present invention relates to an air supply arrangement for supplying air from the atmosphere towards an internal combustion engine in a vehicle. The air supply arrangement comprises an air intake for intake of air from the atmosphere, an air outlet for outlet of air towards the internal combustion engine an air duct for leading air from the air intake in a downstream direction to the air outlet, and a separator arranged in the air duct so as to divide the air duct into an upstream portion and a downstream portion for filtering of atmospheric air from debris by passage of said atmospheric air through the separator.

According to the present invention, the air supply arrangement further comprises a compressed air delivery arrangement being arranged to supply compressed air towards the separator for cleaning the separator from assembled debris.

By the air supply arrangement comprising a compressed air delivery arrangement which may supply compressed air for cleaning the separator, cleaning of the separator may be performed in a simple and time-efficient manner.

The separator may come in different shapes and sizes. Generally, the separator may be adapted to hinder relatively large debris or dust particles from continuing downstream an air intake system.

Optionally, the compressed air delivery arrangement may be arranged to supply compressed air towards a downstream side of said separator. Hence, the debris removed from the separator under the action of the compressed air will naturally remain on the upstream side of the separator.

Optionally, the compressed air delivery arrangement is controllable to supply compressed air at a pressure between 1 bar and 12 bar.

Optionally, the compressed air delivery arrangement is controllable to clean the filter when the internal combustion engine of the vehicle is shut off. Optionally, the compressed air delivery arrangement is controlled by a control unit. The control unit may hence control different parameters such as the timing, duration and pressure of the supply of compressed air from the compressed air delivery arrangement.

Optionally, the compressed air delivery arrangement is adapted to be connected to a compressed air supply of the vehicle.

Optionally, the compressed air delivery arrangement comprises at least one compressed air delivery nozzle arranged in the downstream portion of the air duct. Optionally, the compressed air delivery arrangement may comprise between 1 and 10, preferably between 2 and 6 compressed air delivery nozzles. Advantageously, the nozzles are arranged so as to apply compressed air at least from a downstream direction of the separator.

Optionally, the separator may be arranged in a vertical plane. When the separator is arranged in a vertical plane, debris being removed from the separator by the application of compressed air may naturally fall downwards and away from the separator itself.

Optionally, the separator comprises a plurality of separator passages, said separator passages extending at least along a vertically upward direction as seen from the upstream portion to the downstream portion, so as to direct air in a direction at least in a vertically upward direction.

Optionally, the separator passages form concave inner surfaces, as seen from a vertically downward direction, and in a vertical cross section, the concave inner surfaces deflecting the air coming from the upstream portion towards the downstream portion.

Optionally, said concave inner surfaces are formed by partly spherical surfaces.

Optionally, said separator passages are formed between individual air deflecting structures. Optionally each air defecting structure forms an upstream outer surface and a downstream outer surface, said separator passages being formed between an upstream outer surface and a downstream outer surface of adjacent air deflecting structures.

Optionally, the individual air deflecting structures may be vertically aligned. Optionally, the individual air deflecting structures may be horizontally aligned.

Optionally said air deflecting structures comprise partly spherical envelope surfaces, preferably each air deflecting structure comprises a quarter of a spherical envelope surface.

Optionally, a radius of said spherical surfaces is between 2 and 50 mm. Optionally, the vertical and horizontal distance between each spherical envelope is 1-15 mm.

Optionally, the number of air passages and/or individual air deflecting structures per square dm is between 2 and 420. Optionally, the number is between 100 and 300.

It will be understood that a separator as described in the above is suitable for use in the air supply arrangement of the present invention. However, the separator as such may also be used in other air supply arrangements, in particular in a pre-cleaner arrangement. Hence, the present disclosure relates also to a separator as described in the above per se.

Optionally, the air supply arrangement comprises a debris accommodating space arranged in connection with the upstream portion and vertically below said separator. Hence, debris removed from the separator by compressed air may fall down into the debris accommodating space.

Optionally, the air intake is arranged vertically above said air outlet, preferably vertically above said separator.

Optionally, said air outlet is arranged vertically below said separator.

A second aspect of the present invention relates to an air intake assembly for supplying air from the atmosphere towards an internal combustion engine in a vehicle, comprising an air supply arrangement according to the first aspect of the invention, being arranged upstream an air cleaner for additional cleaning of the intake air before reaching the internal combustion engine.

A third aspect of the present invention relates to a vehicle comprising an air supply arrangement according to the first aspect of the invention, and/or an air intake assembly according to the second aspect of the invention, preferably said vehicle comprises an internal combustion engine.

Optionally, the vehicle comprises a compressed air supply, wherein said compressed air delivery arrangement is connected to said compressed air supply.

A fourth aspect of the present invention relates to a method for controlling an air supply arrangement according to the first aspect of the invention and/or an air intake assembly according to the second aspect of the invention, comprising the step of: activating said compressed air delivery arrangement to supply compressed air for cleaning the separator from assembled debris, preferably said step of activating said compressed air delivery arrangement is performed upon shutdown of the internal combustion engine.

It will be understood that features and advantages as described herein with reference to any one out of the first, second, third and fourth aspects of the invention may be combined with any one of the other aspects of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Like reference numerals refer to the same features in FIGS. 3 to 6*b*.

DETAILED DESCRIPTION OF EXAMPLE EMBODIMENTS OF THE INVENTION

The invention will be described below for a vehicle in the form of a truck 1 such as the truck illustrated in FIG. 1. The truck 1 should be seen as an example of a vehicle which could comprise an air supply arrangement according to the present invention and/or a separator as described herein.

However, the present invention may be implemented in a plurality of different types of vehicles. Purely by way of example, the present invention could be implemented in a truck, a tractor, a car, a bus, a work machine such as a wheel loader or an articulated hauler, or any other type of construction equipment.

Figure 1:
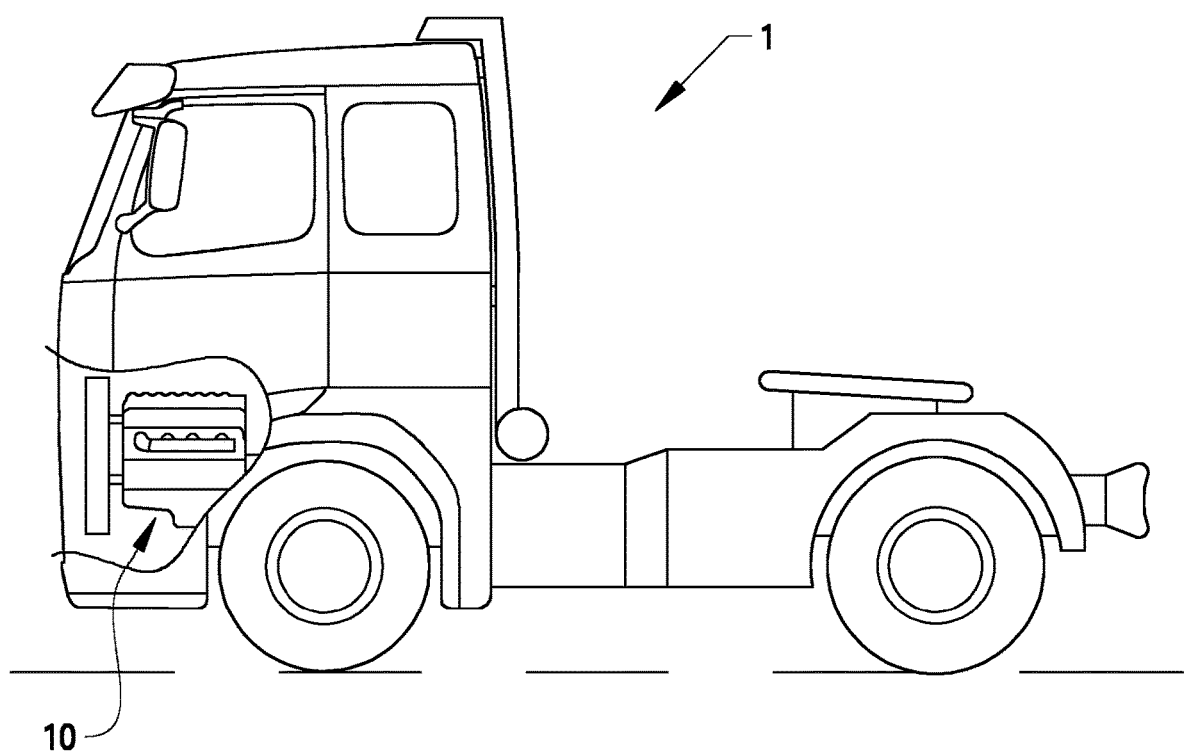
FIG. 1 is a schematic view of a vehicle.
Figure 2:
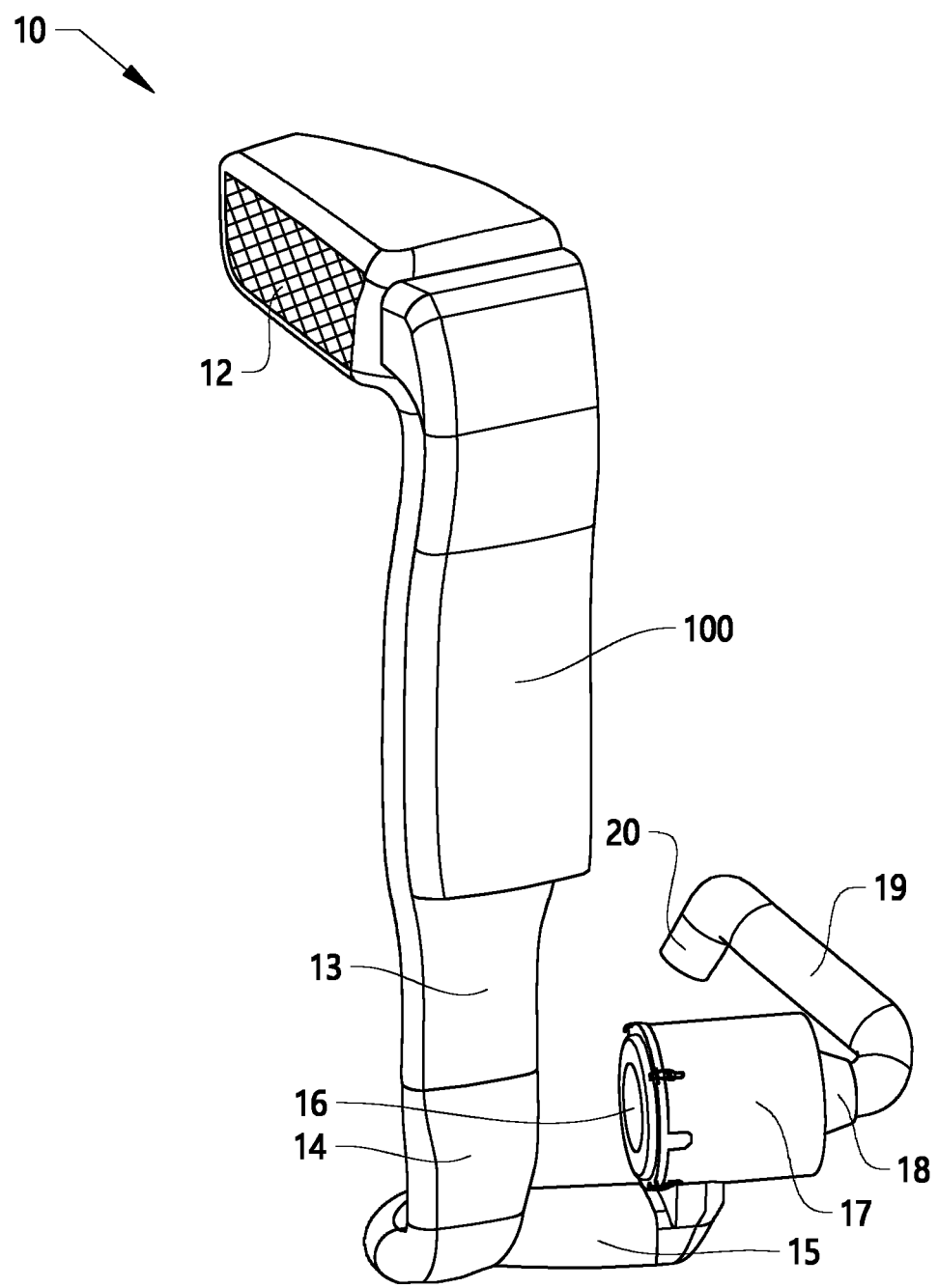
FIG. 2 is a schematic view of an air intake system.

The FIG. 1 vehicle 1 comprises an air intake system 10 as illustrated in FIG. 2. An air intake system 10 is generally arranged so as to supply air from the outside of a vehicle, e.g. from the outside of the cab, to an internal combustion engine of the vehicle.

The air intake system 10 of FIG. 2 will now be described as an example. However, it is to be understood that the present invention may be applied also in other variants of air intake systems.

The air intake system 10 of FIG. 2 comprises an air intake 12 in connection with outside air. The air intake 12 is in communication with an air duct 13 for transferring air further into the vehicle 1. The exemplified air duct 13 has an elongated shape which is arranged in a generally vertical direction (with respect to a vertical direction of the vehicle). The air duct 13 leads the air to a bellow 14, which in turn is connected to a turn chamber 15. From the turn chamber 15 the air is fed further downstream to an air cleaner 16, 17, comprising an air cleaner housing 17 and an air cleaner cover 16. Inside the air cleaner housing 17, an air filter (not visible in FIG. 2) is arranged. The air cleaner cover 16 is removable from the air cleaner housing 17 so as to enable replacement of the air filter when necessary.

The air cleaner housing 17 is in connection with an air cleaner rubber bellow 18 which is in turn connected an intermediate pipe 19. Downstream the intermediate pipe 19, there is a turbo inlet, here in the form of a turbo inlet rubber bellow 20. From the turbo inlet, the air will continue downstream towards the internal combustion engine (not shown in FIG. 2).

It is to be understood that the illustrated air intake system 10 is exemplary, and that the invention may be applied to numerous variants of air intake systems. In the following, exemplary embodiments of the invention will be described with reference to FIGS. 3 to 6.

Figure 3:
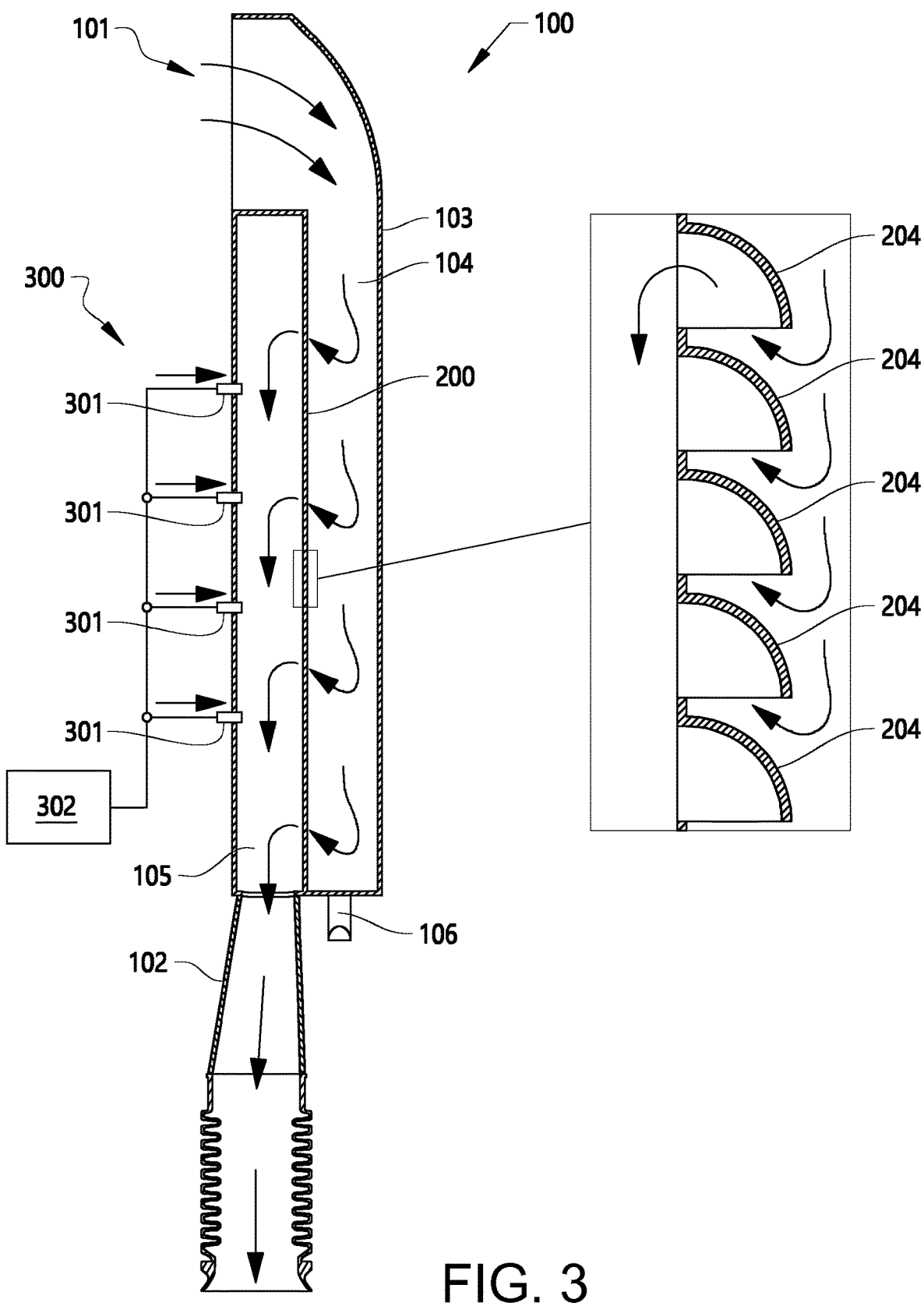
FIG. 3 is a schematic view of an air intake arrangement according to an embodiment of the invention.

FIG. 3 illustrates an air supply arrangement 100 for supplying air from the atmosphere towards an internal combustion engine in a vehicle, the air supply arrangement comprising an air intake 101 for intake of air from the atmosphere, an air outlet 102 for outlet of air towards the internal combustion engine, an air duct 103 for leading air from the air intake 101 in a downstream direction to the air outlet 102. It is to be understood that the air intake 101 may correspond to the air intake 12 of the air intake system 10 of FIG. 2, and that the air duct 103 may correspond to the air duct 13 of the air intake system of FIG. 2. However, as mentioned in the above, the air supply arrangement 100 of FIG. 3 may also be applied in other variants of air intake systems.

As seen in FIG. 3, the air supply arrangement 100 comprises a separator 200 arranged in the air duct 103 so as to divide the air duct 103 into an upstream portion 104 and a downstream portion 105 for filtering of atmospheric air from debris by passage of said atmospheric air through the separator 200.

In use, air from the outside of the vehicle will pass through the air intake 101 into the upstream portion 104 of the air duct 103. Then, the air will pass through the separator 200, into the downstream portion 105, which will cause at least some of the debris in the air to be removed therefrom by the passage through the separator 200. From the downstream portion 105 of the air duct, the air continues to the outlet 102.

In the air supply arrangement 100 of FIG. 3, the separator 200 is arranged in a generally vertical plane. The air intake 101 is arranged vertically above said air outlet 102, preferably vertically above said separator 200. This means that intake air 101 will enter into the upstream portion 104 of the air duct 103 from a generally upward direction. Or, in other words, the intake air 100 will enter into the upstream portion 104 from a direction being generally parallel to a plane including the separator 200.

The air outlet 102 is arranged vertically below the separator 200. Accordingly, air having passed through the separator 200 will be redirected in a vertically downward direction before reaching the outlet 102.

The air supply arrangement 100 in FIG. 3 further comprises a debris accommodating space 106 arranged in connection with the upstream portion 104 and vertically below said separator 200. Advantageously, the debris accommodating space 106 may be arranged such that the assembled debris may be removed when necessary. For example, the debris accommodating space 106 may house a fluid filled container (not shown) into which debris may be assembled.

Debris filtered away from the air by passage through the separator 200 may immediately fall down from the separator 200 by action of gravity, so as to be assembled in the debris accommodating space 106. However, some of the debris filtered away from the air by passage through the separator 200 may remain trapped in the separator 200. For example, dust particles may clog in the separator passages of the separator 200. Such clogging of particles will eventually impact the efficiency of the separator 200.

In the illustrated air supply arrangement 100, a compressed air delivery arrangement 300 is provided to supply compressed air for cleaning the separator 200 from assembled debris. Hence, the compressed air delivery arrangement 300 may be activated when required for cleaning the separator 200 from assembled debris.

The compressed air delivery arrangement 300 is arranged to supply compressed air towards a downstream side of said separator 200. Hence, any debris removed under the pressure of compressed air flowing through the filter in an upstream direction (if referring to normal use of the air supply arrangement) will fall out in the upstream portion 104 of the air duct. Hence, the debris will not risk continuing towards the outlet 102, but may instead be assembled in the debris accommodating space 106.

The compressed air delivery arrangement 300 may advantageously be controllable to supply compressed air at a pressure between 1 bar and 12 bar.

Further, the compressed air delivery arrangement 300 is controllable to clean the filter 200 when the internal combustion engine of the vehicle is shut off.

Preferably, a control unit may be arranged to control the compressed air delivery arrangement 300. Although not shown in the Figures it will be understood how a control unit may be connected to a compressed air delivery arrangement 300, so as to control e.g. the pressure of the compressed air, and/or the timing of the activation of the compressed air delivery arrangement 300, for example to control the air delivery arrangement 300 such that it is activated when the internal combustion engine of the vehicle is shut off, and/or the duration of the activation of the compressed air delivery arrangement 300.

Hence, the control unit may be arranged to perform the following step: activating said compressed air delivery arrangement 300 to supply compressed air for cleaning the separator 200 from assembled debris. Preferably said step of activating said compressed air delivery arrangement (300) is performed upon shutdown of the internal combustion engine.

Optionally, the compressed air delivery arrangement 300 could instead be activated manually, for example by a user pressing a control button.

Optionally, a sensor indicating that the efficiency of the separator 200 is impaired may be provided. The activation of the compressed air delivery arrangement 300 may in this case be automatically performed using a signal from said sensor as input to the control unit. Alternatively, the sensor could indicate the impaired efficiency of the separator to a user e.g. by means of a display or other user indicating means.

The compressed air delivery arrangement 300 may advantageously be connected to a compressed air supply of the vehicle, which supply is used for other applications in the vehicle 1, such as dampers.

To supply compressed air, the compressed air delivery arrangement 300 comprises at least one compressed air delivery nozzle 301 arranged in the downstream portion 105 of the air duct 103. In FIG. 3, the compressed air delivery arrangement 300 comprises four nozzles 301, however, the number and arrangement of nozzles 301 may naturally be varied to ensure that the separator 200 receives sufficient compressed air over its downstream surface so as to ensure sufficient cleaning of the separator 200.

The separator 200 may be any filter or net structure which is capable of filtering debris from passaging air. It is to be understood that the separator 200 is to perform a first cleaning of the air, which is suitable in particular when the vehicle travels in a dusty environment.

Hence, it is understood that the air leaving the downstream portion 105 after passage through the separator 200 is generally not clean enough to be immediately entered into a combustion engine. Instead, it is envisaged that the air supply arrangement 100 is to form part of an air intake assembly, wherein it is arranged upstream an air cleaner for additional cleaning of the intake air before reaching the internal combustion engine. For example, the air intake assembly may be an air intake assembly 10 as described in FIG. 2, comprising an air supply arrangement 100, 13 being arranged upstream the air cleaner 17 for additional cleaning of the intake air before reaching the internal combustion engine.

The separator may advantageously be a separator 200 which comprises a plurality of separator passages 201, said separator passages 201 extending at least along a vertically upward direction as seen from the upstream portion 104 to the downstream portion 105, so as to direct air in a direction at least in a vertically upward direction. As may be gleaned from FIG. 3, where the separator 200 is arranged along a vertical plane, with such a separator 200 the air will be forced at least along a vertically upward direction when passing through the separator passages 201 of the separator 200. This arrangement is advantageous in that the redirection of the air will cause the debris contained in the air stream to fall out. In other words, when the air stream containing the debris is redirected by the inner surfaces of the separator passages 201, the impact of the inner surfaces of the separator passages 201 and/or the redirection will hinder the debris from following the air stream's continued way through the separator 200.

In particular, such a separator 200 is efficient when arranged in an air duct 103 as described in the above, wherein the air in the upstream portion 104 is directed in a generally vertically downward direction from the air inlet 101. Accordingly, the air will first be directed downwards from the air inlet 101 into the upstream portion 104, and then upwards through the separator 200, which is further efficient to remove debris from the air stream.

FIGS. 3 to 6b illustrate an example of a separator 200 which is particularly useful with the air supply arrangement 100 as described in the above. The separator 200 is efficient for removing debris from atmospheric air, and it is understood that the separator 200 may be cleaned when necessary by action of the compressed air delivery arrangement 300. However, it is to be understood that the separator 200 as described with reference to FIGS. 4 to 6 may also be used in other air supply arrangements 100, with or without compressed air delivery arrangement 300.

Figure 4A:
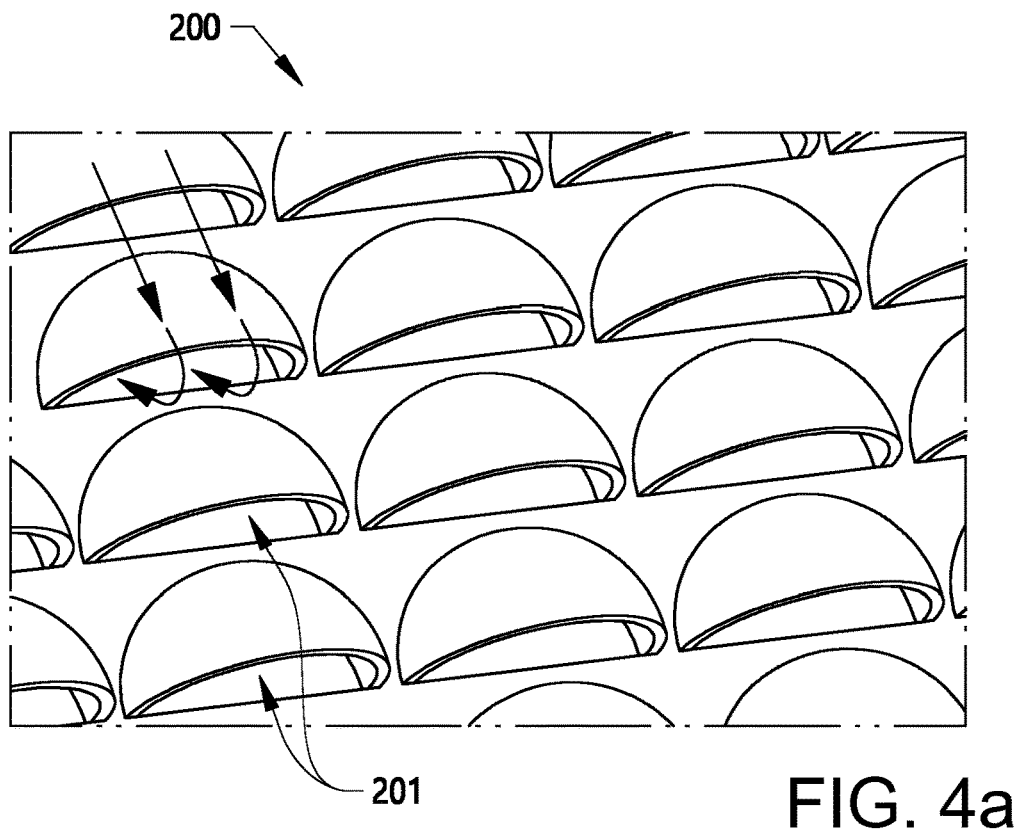
FIGS. 4*a* and 4*b* illustrate an embodiment of a separator for an air intake arrangement.
Figure 4B:
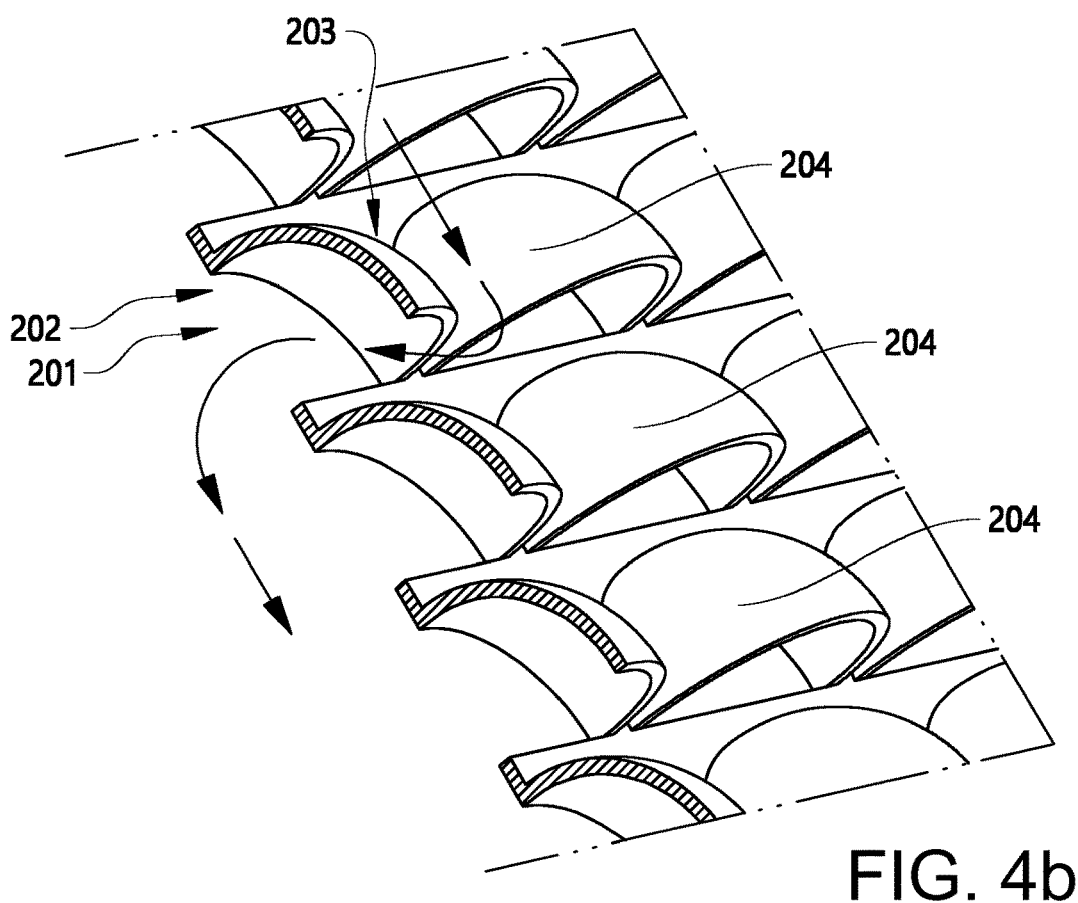
Figure 5:
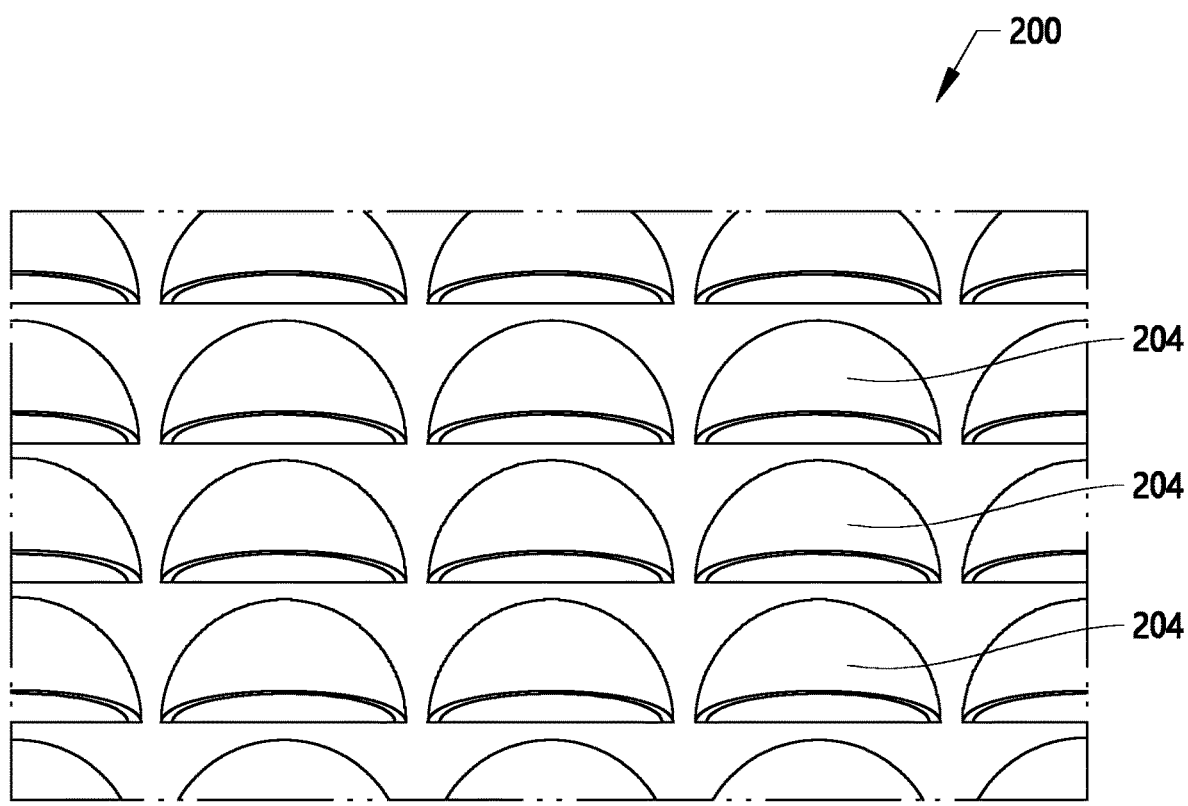
FIG. 5 is a front view of a portion of the separator of FIGS. 4*a* and *b*.

As illustrated in FIGS. 4a and 4b, the separator passages 201 of the separator 200 form concave inner surfaces 202, as seen from a vertically downward direction, and in a vertical cross section. The concave inner surfaces 202 will hence be efficient for deflecting the air coming from the upstream portion 104 towards the downstream portion 105. Such concave inner surfaces 202 have been found to be efficient for removing debris from the air stream.

In FIGS. 4a and 4b, it is illustrated how the concave inner surfaces 202 are formed by partly spherical surfaces.

In the embodiment of FIGS. 4a and 4b, the separator 200 may be described as comprising separator passages 201 being formed between individual air deflecting structures 204. Here, each air defecting structure 204 forms an upstream outer surface 203 and a downstream outer surface 202. The separator passages 201 will be formed between adjacent air deflecting structures 204, in this case between an upstream outer surface 203 and a downstream outer surface 202 of adjacent air deflecting structures 204.

In the illustrated embodiment, the air deflecting structures 204 comprise partly spherical envelope surfaces. As seen in FIGS. 4a to 6b each air deflecting structure 204 comprises a quarter of a spherical envelope surface. Although this design has been found to be particularly advantageous, it is possible to form air deflective structures 204 having other partly spherical envelope surfaces, than a quarter sphere.

Further, in the illustrated embodiment the air deflecting structures 204 are vertically aligned, such that the separator passages 201 are formed between the quarter spherical upstream outer surface 203 and the quarter spherical downstream outer surface 202 of vertically adjacent air deflective structures. Also, in the illustrated embodiment, the air deflecting structures 204 are horizontally aligned.

Figure 6A:
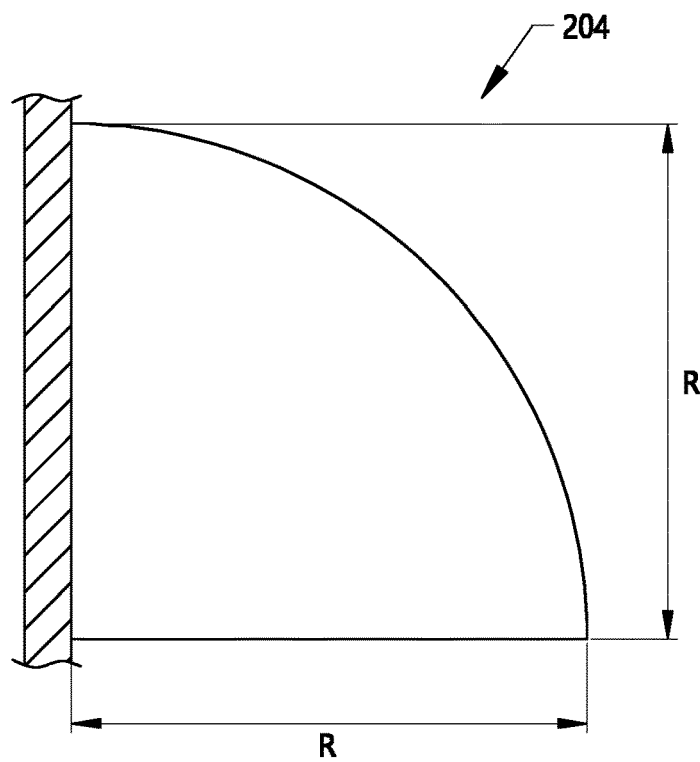
FIGS. 6*a* and 6*b* illustrate details of the separator of FIGS. 4*a*, 4*b* and 5.
Figure 6B:
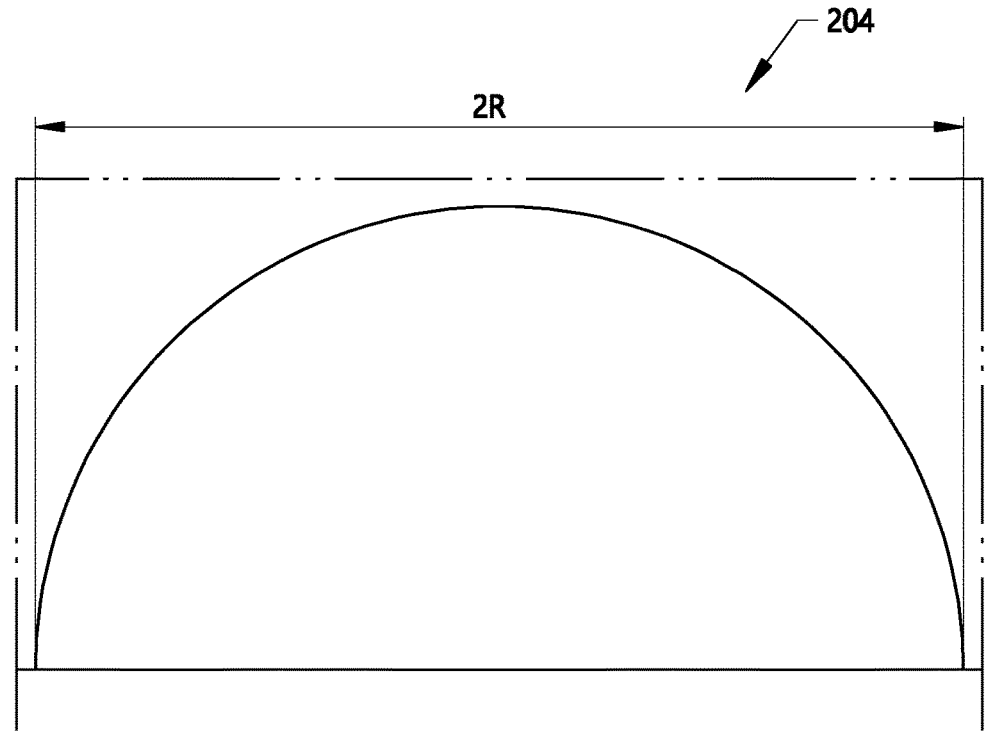

A radius R of said spherical surfaces as seen in FIGS. 6a and 6b may be between 2 and 50 mm, preferably between 5 and 25 mm.

The vertical and horizontal distance between each spherical envelope may be 1-15 mm.

The number of separator passages 201 and/or individual air deflecting structures 204 per square dm may be selected to suit different applications. but may generally be between 2 and 420.

The separator 200 may be made by any conventional method, for example by moulding of a plastic material.

It is to be understood that the present invention is not limited to the embodiments described above and illustrated in the drawings; rather, the skilled person will recognize that many changes and modifications may be made within the scope of the appended claims.

The invention claimed is:

1. An air supply arrangement for supplying air from the atmosphere towards an internal combustion engine in a vehicle, the air supply arrangement comprising:
   an air intake for intake of air from the atmosphere;
   an air outlet for outlet of air towards the internal combustion engine;
   an air duct for leading air from the air intake in a downstream direction to the air outlet;
   a separator in the air duct so as to divide the air duct into an upstream portion and a downstream portion for filtering of atmospheric air from debris by passage of the atmospheric air through the separator; and
   a compressed air delivery arrangement configured to supply compressed air towards the separator for cleaning the separator from assembled debris, wherein the separator comprises a plurality of separator passages, the separator passages extending at least along a vertically upward direction of the separator as seen from the upstream portion to the downstream portion, and being formed so as to redirect air from a downward direction in the upstream portion to an at least vertically upward direction when entering the separator passages and subsequently, by the separator passages, redirected in a downward direction when having passed through the separator.

2. The air supply arrangement of claim 1, wherein the compressed air delivery arrangement supplies compressed air towards a downstream side of the separator.

3. The air supply arrangement of claim 1, wherein the compressed air delivery arrangement supplies compressed air at a pressure between 1 bar and 12 bar.

4. The air supply arrangement of claim 1, wherein the compressed air delivery arrangement is controllable by a control unit to clean the filter when the internal combustion engine of the vehicle is shut off.

5. The air supply arrangement of claim 1, wherein the compressed air delivery arrangement is configured to be connected to a compressed air supply of the vehicle.

6. The air supply arrangement of claim 1, wherein the compressed air delivery arrangement comprises at least one compressed air delivery nozzle arranged in the downstream portion of the air duct.

7. The air supply arrangement of claim 1, wherein the separator is arranged in a vertical plane.

8. The air supply arrangement of claim 1, wherein the separator passages form concave inner surfaces, as seen from a vertically downward direction, and in a vertical cross section, the concave inner surfaces deflecting the air coming from the upstream portion towards the downstream portion.

9. The air supply arrangement of claim 8, wherein the concave inner surfaces are formed by partly spherical surfaces.

10. The air supply arrangement of claim 1, wherein the separator passages are formed between individual air deflecting structures the separator passages being formed between an upstream outer surface and a downstream outer surface of adjacent air deflecting structures.

11. The air supply arrangement of claim 10, wherein the air deflecting structures comprise partly spherical envelope surfaces.

12. The air supply arrangement of claim 9, wherein a radius of the spherical surfaces is between 2 and 50 mm.

13. The air supply arrangement of claim 1, wherein the number of separator passages and/or individual air deflecting structures per square dm is between 2 and 420.

14. The air supply arrangement of claim 1, comprising a debris accommodating space arranged in connection with the upstream portion and vertically below the separator.

15. The air supply arrangement of claim 1, wherein the air intake is arranged vertically above the air outlet.

16. The air supply arrangement of claim 1, wherein the air outlet is arranged vertically below the separator.

17. An air intake assembly for supplying air from the atmosphere towards an internal combustion engine in a vehicle, comprising an air supply arrangement the air supply arrangement comprising:
- an air intake for intake of air from the atmosphere;
- an air outlet for outlet of air towards the internal combustion engine;
- an air duct for leading air from the air intake in a downstream direction to the air outlet;
- a separator arranged in the air duct so as to divide the air duct into an upstream portion and a downstream portion for filtering of atmospheric air from debris by passage of the atmospheric air through the separator; and
- a compressed air delivery arrangement supplies compressed air towards the separator for cleaning the separator from assembled debris, wherein the separator comprises a plurality of separator passages, the separator passages extending at least along a vertically upward direction of the separator as seen from the upstream portion to the downstream portion, and being formed so as to redirect air from a downward direction in the upstream portion to an at least vertically upward direction when entering the separator passages and subsequently, by the separator passages, redirected in a downward direction when having passed through the separator;
- wherein the air supply arrangement is upstream from an air cleaner for additional cleaning of the intake air before reaching the internal combustion engine.

18. The air supply arrangement of claim 10, wherein each air deflecting structure forms an upstream outer surface and a downstream outer surface.

19. The air supply arrangement of claim 11, wherein each air deflecting structure comprises a quarter of a spherical envelope surface.

* * * * *